United States Patent [19]

Oberdörfer

[11] Patent Number: 4,768,749
[45] Date of Patent: Sep. 6, 1988

[54] CONTROL DISC VALVE
[75] Inventor: Hans E. Oberdörfer, Stuttgart, Fed. Rep. of Germany
[73] Assignee: Hansa Metallwerke AG, Fed. Rep. of Germany
[21] Appl. No.: 47,000
[22] Filed: May 7, 1987

Related U.S. Application Data
[63] Continuation of Ser. No. 906,958, Sep. 15, 1986, abandoned.

[30] Foreign Application Priority Data
Sep. 28, 1985 [DE] Fed. Rep. of Germany ....... 3534692

[51] Int. Cl.$^4$ ............................................ F16K 11/065
[52] U.S. Cl. .................................. 251/50; 137/625.17; 137/625.4
[58] Field of Search .................. 137/625.17, 625.4; 251/50

[56] References Cited
U.S. PATENT DOCUMENTS
4,316,599  2/1982  Bouvet ............................ 251/50 X
4,543,977 10/1985  Arav .............................. 251/50 X
4,596,376  6/1986  Knapp ....................... 137/625.17 X Primary Examiner—Robert G. Nilson
Attorney, Agent, or Firm—Fred Philpitt

[57] ABSTRACT

In a control disc valve, which is intended particularly for sanitary use, a first control disc containing water inlet openings is arranged in a stationary manner. A second control disc, which contains a recess, for example a guide channel through which water flows, is able to move with respect to the first control disc. A movement brake is provided, which retards the closing movement of the second control disc at least in the region immediately before the complete closure of the valve. For this purpose a cylinder bore is located in the movable control disc, which bore communicates with the recess in the second control disc through which water flows. A damping piston moves in the cylinder bore. The piston is actuated by way of a plunger, which at the time of the movement of the control disc abuts against another part of the valve, in particular against the wall of the cartridge housing.

13 Claims, 5 Drawing Sheets

CONTROL DISC VALVE

The present invention is a continuation of Ser. No. 906,958 filed Sept. 15, 1986, now abandoned.

DESCRIPTION

The invention relates to a control disc valve, in particular for sanitary use, with a first control disc, which contains at least one water inlet, with a second control disc, which is supported on the first control disc and comprises a recess through which water flows, in which case a movement of the second control disc brings about a variation in the quantity of water flowing through the control disc, with a movement brake which comprises a damping piston able to move in a cylinder bore and provides a braking force opposing the movement of the second control disc at least in the section of movement immediately before the completely closed position.

A control disc valve of this type is known from German OS No. 32 46 350. In the latter, high pressure surges in the piping, which could be caused by sudden closure of the sanitary fitting, are prevented by a movement brake, which is connected to the movable control disc. This movement brake consists of a piston, which is connected to the movable control disc by way of a piston rod and moves to and fro in a water-filled cylinder. The cylinder itself is located in the body of the fitting. Its filling takes place by way of a connection to the water outlet of the fitting. In this known control disc valve it is a drawback that it is difficult to locate the movement brake as regards space and this causes high costs both in production as well as in assembly. Valves which are already commercially available and fitting housings, together with which the valves are to be used, must be designed afresh from first principles, in order that the teaching disclosed in German OS No. 32 46 350 can be followed.

For the above reasons in the prior patent application P No. 35 24 149.7, it was already proposed to locate the movable control disc itself in a substantially closed chamber, which is filled with a fluid medium, and thus to use it simultaneously as the piston of the movement brake. However, this design pre-supposes that the provision of a closed chamber is possible, in which the movable control disc will move.

It is the object of the present invention to provide a control disc valve of the aforementioned type, in which the basic construction can be substantially maintained, alterations to the outer fitting housing are not necessary and in particular the space requirement for the movement brake is very small.

This object is achieved according to the invention due to the fact that the cylinder bore is located in the second control disc and is connected by way of a bore to the recess in the second control disc, that the damping piston cooperates by an end constructed as a plunger with a part with respect to which the plunger carries out a relative movement at the time of the movement of the second control disc.

Thus, according to the invention the cylinder bore is located directly in the movable control disc. The necessary relative movement between the cylinder bore and damping piston is achieved due to the fact that the damping piston provided with a plunger abuts against another part of the valve when the second control disc moves. Filling of the cylinder bore takes place over the shortest route from the recess through which water flows, which is located in the second control disc.

The construction is particularly favourable geometrically in which the axis of the cylinder bore extends parallel to the plane of contact of the two control discs and the part with which the plunger cooperates is a side wall of the valve. In this way the cylinder bore can be located in virtually all currently known movable control discs, without any alteration to the external dimensions being necessary.

Generally a control disc valve is combined in a cartridge housing, in which the two control discs are located. Then it is possible that the side wall, against which the plunger of the damping piston abuts, is the side wall of the cartridge housing.

However it is also possible that the axis of the cylinder bore extends at right angles to the plane of contact of the two control discs, in which case the plunger then cooperates with an inclined ramp on the stationary part of the valve located thereabove. In many control disc valves, the movement of the second control disc is brought about by an adjusting shaft, which is mounted to tilt in a bearing part and engages by an entrainment head in an entrainment opening in the second control disc. In this case it is appropriate that the inclined ramp is constructed on the bearing part. If the control disc valve is a one-hand mixer valve, then in this case when varying the temperature of the emerging mixed water, the bearing part rotates therewith, due to which even the inclined ramp is entrained in the necessary manner.

It is also possible that the plunger passes through the bearing part and at its end cooperates with a hammer-like projection on the adjusting shaft. In this case also it is ensured that when the control disc valve is constructed as a mixer valve, the plunger can rotate therewith when varying the temperature of the emerging mixed water, since even the bearing part itself is able to rotate.

In many control disc valves, the second control disc is composed of a flat ceramic disc and a plastic part. In these cases the cylinder bore is appropriately located in the plastic part. Consequently the production costs are considerably reduced, since the plastic part can be fabricated very much more easily than the ceramic disc.

A particularly appropriate construction of the movement brake is characterised by the fact that (a) the damping piston has an inner piston and at an axial distance therefrom an outer piston;

(b) the cylinder bore comprises an inner section and an outer section, in which case the inner piston cooperates with the inner section of the cylinder bore and the outer piston cooperates with the outer section of the cylinder bore;

(c) a displacement path connects the inner section to the outer section of the cylinder bore;

(d) the bore, which connects the recess in the second control disc to the cylinder bore, opens into the outer section of the cylinder bore. With this construction, the return of the damping piston, which does not have any positive entrainment connection to another part of the valve, is brought about by the pressure of the water located in the cylinder bore. Thus no spring is required. Without water the damping piston remains in its inner-most position.

The displacement path may be an axial groove in the wall of the inner section of the cylinder bore. In this case it is possible that the cross section of the groove varies over its longitudinal extent. Consequently the braking force may be varied in the desired manner during the movement of the control disc.

In a particular construction of the invention, the inner piston is constructed as a lip-type packing. Due to this a special speed dependence of the braking force is achieved. If a stop limits the outwardly directed movement of the damping piston, the latter is normally not in contact with the part against which it abuts for producing the braking force. Consequently the wear on the plunger and on the part cooperating therewith is reduced. Embodiments of the invention are described in detail hereafter with reference to the drawing. The single figure is an axial section through a single lever mixer valve constructed in the form of a cartridge.

The drawings illustrate specific variations of my inventive concept and more particularly:

FIG. 1 through 5 show different embodiments of the invention.

Figure 1:
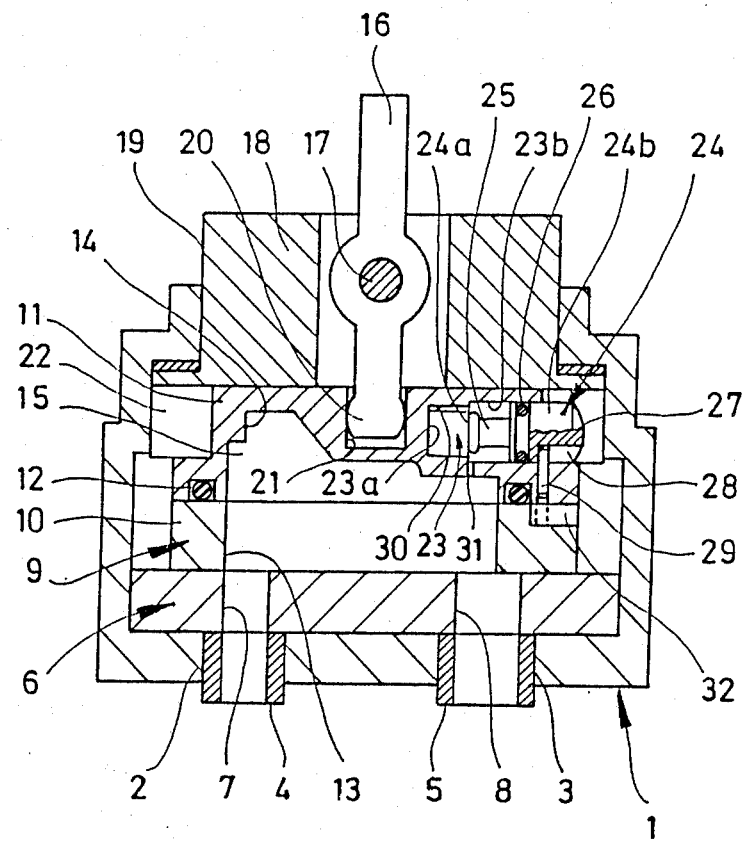
FIG. 1 is a sectional view howing a first embodiment of the invention.

The single lever mixer valve illustrated comprises a cup-shaped cartridge housing 1, passing through the base of which are two water inlet openings 2 (only one is shown in the drawing) and a water return opening 3.

Hollow cylindrical washers 4, 5 are respectively located in the water inlet openings 2 and in the water return opening 3, by which the water-tight transition to the outer fitting housing (not shown) is produced, in which the single lever mixer valve is inserted.

Located within the cartridge housing 1 and on its base in a non-rotatable and non-displaceable manner is a first control disc 6 of ceramic material, whereof the upwardly pointing end face is polished to a high quality and flatness. The first control disc 6 likewise contains two water inlet openings 7 and a water return opening 8, which communicate with the corresponding openings 2, 3 in the base of the cartridge housing 1 or with the interior of the washers 4, 5.

Located above the first control disc 6 is a second control disc 9, which is able both to rotate and slide with respect to the first control disc 6. It is assembled from a lower, flat ceramic disc 10 and an upper plastic part 11 by means of a form-locking member 32 and with the addition of a washer 12. On the lower end face, which slides on the first control disc 6, the ceramic disc 10 is likewise polished to a high quality and flatness. It contains a through hole 13 having a large surface area, which continues on the upper side in a recess 14 of the plastic part 11. The through hole 13 in the ceramic disc 10 and the recess 14 in the plastic part 11 jointly form a guide channel 15 for the second control disc 9, through which water may flow from the inlet openings 7 to the return opening 8 in the first control disc 6 in the case of a corresponding relative position of the two control discs 6, 9.

The second control disc 9 is moved by an adjusting shaft 16, which is mounted to tilt by means of a journal 17 in a rotary bearing part 18 and together with the bearing part 18 can be rotated about the vertical axis of the valve. In this case the bearing part 18 projects from the cartridge housing 1 by an axial neck. On its underside the bearing part 18 comprises a groove 22, whereof the parallel side faces serve as guide faces for corresponding guide surfaces on the second control disc 9.

At its lower end the adjusting shaft 16 is provided with an enlarged entrainment head 20, which engages in an entrainment opening 21 on the upper end face of the second control disc 9. An operating lever (not shown) is attached in known manner to the upper end of the adjusting shaft 16.

In the drawing, the single lever mixer valve is shown in its open position. It is brought into the closed position in that the movable control disc 9 is moved towards the right by tilting of the adjusting shaft 16 in counter clockwise direction in the drawing, until the guide channel 15 in the second control disc 9 no longer overlaps the water inlet openings 7 in the first control disc 6. In order that this closing movement cannot take place too quickly (which could lead to water hammering in the attached piping), the movable control disc 9 is equipped with a movement brake.

For this purpose a stepped cylinder bore 23 is located in the plastic part 11 of the movable control disc 9, the axis of which bore extends parallel to the direction of movement of the movable control disc 9, thus parallel to the plane of contact of the two control discs 6, 9.

A damping piston 24 is constructed as a double piston is arranged to slide in the cylinder bore 23. It comprises an inner piston 24a and an outer piston 24b, which are kept at an axial distance apart by way of a rod 25.

The inner piston 24a, which cooperates with the inner, narrower section 23a of the cylinder bore 23, is constructed as a resilient lip-type packing. The outer piston 24b, which cooperates with the outer, wider section 23b of the cylinder bore 23, is a rigid member, in whose peripheral wall an 0-ring washer 26 is inserted. In its region projecting from the cylinder bore 23, it is designed as a plunger 27 with a rounded head. Formed in the lower side of the plunger region of the outer piston 24b is an axis parallel groove 28 of predetermined length, in which an abutment pin 29 engages. The latter is attached in a vertical manner in the plastic part 11.

An axis parallel groove 30 of small cross section is located in the side wall of the inner section 23a of the cylinder bore 23. A bore 31 of small diameter connects the outer section 23b of the cylinder bore 23 to the guide channel 15 of the second control disc 9.

The afore-described movement brake for the second control disc 9 operates as follows:

If water flows through the guide channel 15 in the second control disc 9 in the open position of the valve illustrated in the drawing, the cylinder bore 23 is filled with water by way of the bore 31. The pressure prevailing in the cylinder bore 23 pushes the double piston 24 so far towards the outside until the abutment pin 29 bears against the inner end of the groove 28. In this position, which is illustrated in the drawing, the plunger 27 of the outer piston 24b is at a distance from the wall of the cartridge housing 1.

Now when the second control disc 9 is moved towards the right in the drawing in order to close the valve, this movement is first of all not influenced. Only when the plunger 27 abuts against the adjacent wall of the cartridge housing 1 does a type of "shock absorber action" begin. In the case of continuing movement of the second control disc 9 towards the right, the water is displaced by the outer piston 24b by way of the bore 31 from the outer section 23b of the cylinder bore 23 into the guide channel 15. At the same time the inner piston 24a enters the inner cylinder bore 23a and displaces the water located therein by way of the groove 30 into the outer section 23b of the cylinder bore 23. The resulting braking force is essentially determined by the cross section of the groove 30 in the wall of the section 23a of the cylinder bore 23. It opposes an excessively rapid movement of the second control disc 9 in the last part of the closing operation before the completely closed position.

A peripheral notch or a through hole in the inner piston 24a may also be considered as an alternative to the groove 30 as a displacement path for the water located in the inner section 23a of the cylinder bore 23. However, when using a groove, the advantage is provided that its cross section can be varied over its longitudinal extent. In this way it is possible to achieve a braking force increasing progressively with the displacement of the second control disc 9.

Due to the construction of the inner piston 24a as a lip-type packing, it is possible to make the braking force particularly dependent on the speed of movement of the second control disc 9. If the latter is high, then a relatively high pressure prevails in the cylinder bore 23, which applies the sealing lip of the inner piston 24a firmly against the cylinder wall. A displacement of the water from the inner section 23a of the cylinder bore 23 is then possible exclusively by way of the groove 30. On the other hand, in the case of a slow movement of the second control disc 9, the pressure in the cylinder bore 23 is so small that the sealing lip of the inner piston 24a is lifted from the cylinder wall and can thus release a relatively large displacement cross section. Then a braking force can hardly be detected. This is a thoroughly desirable effect.

If the valve is opened due to a movement of the second control disc 9 towards the left in the drawing, then water penetrates by way of the bore 31 from the guide channel 15 into the cylinder bore 23 and returns the damping piston 24 to the position shown in the drawing.

If the valve is not connected to any water pipe, as this is frequently the case in exhibition halls, no braking action occurs. The damping piston 24 remains in its innermost position. This also is a desirable feature.

The embodiment illustrated in the drawing with the damping piston 24 moving parallel to the displacement of the discs, which piston cooperates with the side wall of the cartridge housing 1, is geometrically the most favourable. It requires the least overall height for the plastic part 11.

Figure 2:
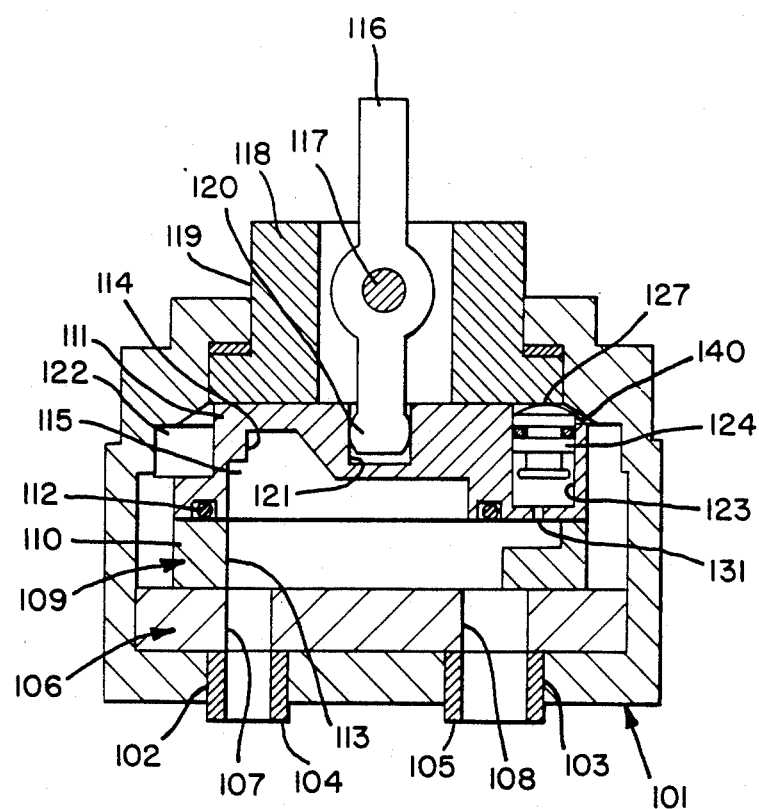
FIG. 2 is a sectional view showing a second embodiment of my invention wherin the axis of th cylinder extends perpindicularly to the dirction of movement of the control disk.
Figure 3:
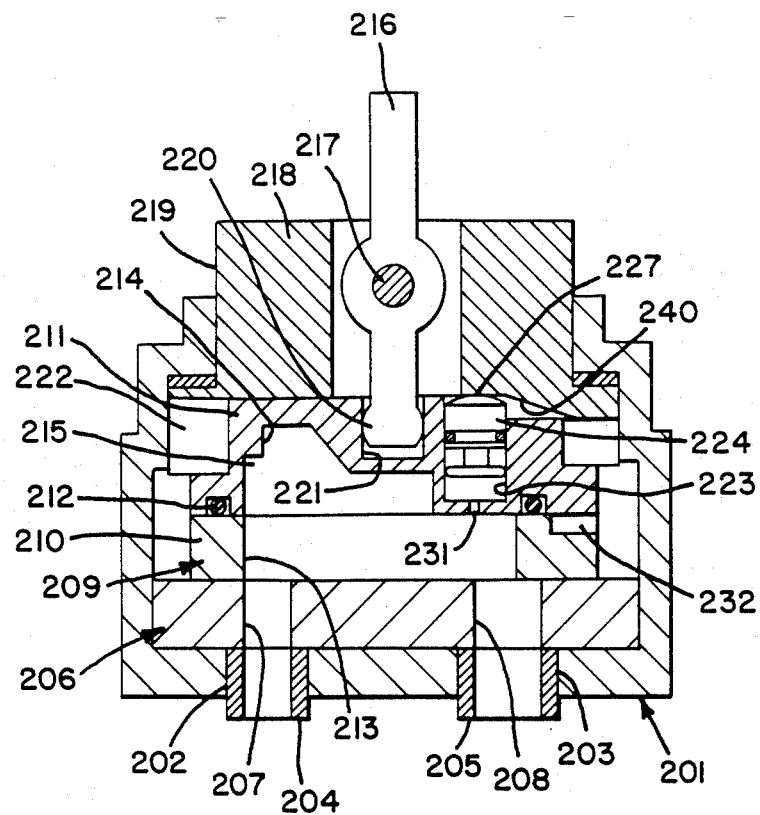
FIG. 3 is a sectional view of a third embodiment of my invention which is similar to the second embodiment but differs in the position of the inclined ramp.

FIG. 2 shows a second embodiment of the invention. Elements which correspond to FIG. 1 embodiment are designated by the same numeral with 100 added. In the embodiment of FIG. 2, the cylinder bore 123 is again located in the plastic part 111 of the movable control disk 109. However, the axis of the cylinder bore 123 extends perpendicularly to the direction of the movement of the movable control disk 109. The damping piston 124 which is arranged to slide in the cylinder bore 123 is formed to comprise a rounded head 127. The rounded head 127 cooperates with an inclined ramp face 140 which is provided in the upper portion of the interior face of the cartridge housing 101. A bore 131 of small diameter connects the bottom of the cylinder bore 123 to the guide channel 115 of the second control disk 109. The function of the embodiment of FIG. 2 is essentially identical to the function of the embodiment of FIG. 1. In the illustrated open position of the valve, the pressure prevailing in the cylinder bore 123 urges the rounded head 127 of the damping piston 124 into contact with the lower face of the rotary bearing part 118. Upon movement of the second control disk 109 towards the right in order to close the valve, the rounded head 127 of the damping piston 124 comes into engagement with the inclined ramp 140. This causes the damping piston 124 to be moved downwardly whereby the water in the cylinder bore 123 is forced through the bore 131 into the guide channel 115. This results in the desired braking force. The further embodiment of the invention illustrated in FIG. 3 is very similar to the embodiment of FIG. 2. The elements corresponding to elements in FIG. 1 have the same number with 200 added. An exception to similarity with FIG. 2 is the position of the inclined ramp 240: it is located in the lower face of the rotary bearing part 218 instead of the interior face of the cartridge housing 201. This difference has no influence on the function of the valve as a whole.

Figure 4:
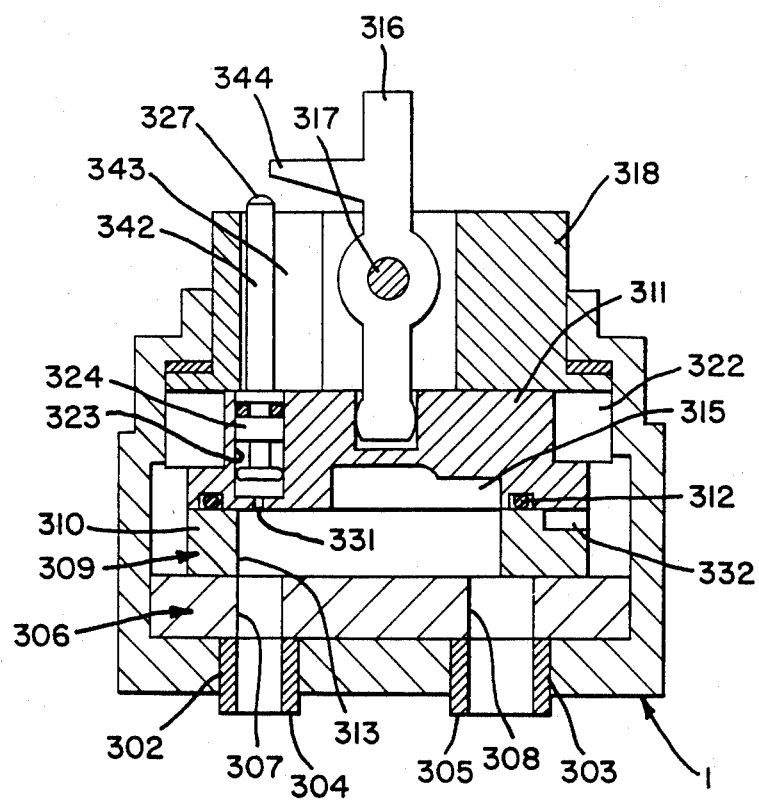
FIG. 4 is a sectional view of a fourth embodiment which is similar to the first embodiment but includes a lateral hammer-like projection.

In the embodiment of the invention illustrated in FIG. 4 elements corresponding to those in FIG. 1 are designated by the same numerals with 300 added. As in the embodiments of the invention illustrated in FIG. 4 elements corresponding to those in FIG. 1 are designated by the same numerals with 300 added. As in the embodiments of FIGS. 2 and 3, the cylinder bore 323 is oriented vertically, i.e. particularly to the direction of movement of the second control disk 309. The damping piston 324 is actuated by means of a piston rod 342 which extends axially through a recess 343 in the rotary bearing part 318 and has a projecting rounded head 327. The adjusting shaft 316 is provided with a lateral hammer-like projection 344. When the second control disk 309 is moved from the illustrated open position into the closed position the piston rod 342 in FIG. 4 moves to the right. Simultaneously, the pivoting movement of the adjusting shaft 316 causes a mutual approachment of the projection 344 and the rounded head 327 of the piston rod 342. Finally, the lower face of the hammer-like projection 344 comes into engagement with the rounded head 327 of the piston rod 342. Further pivotal movement of the adjusting shaft 316 urges the damping piston 324 in the cylinder bore 324 downwards which leads to the desired braking force in the same way as described above for the embodiments of FIGS. 2 and 3.

Figure 5:
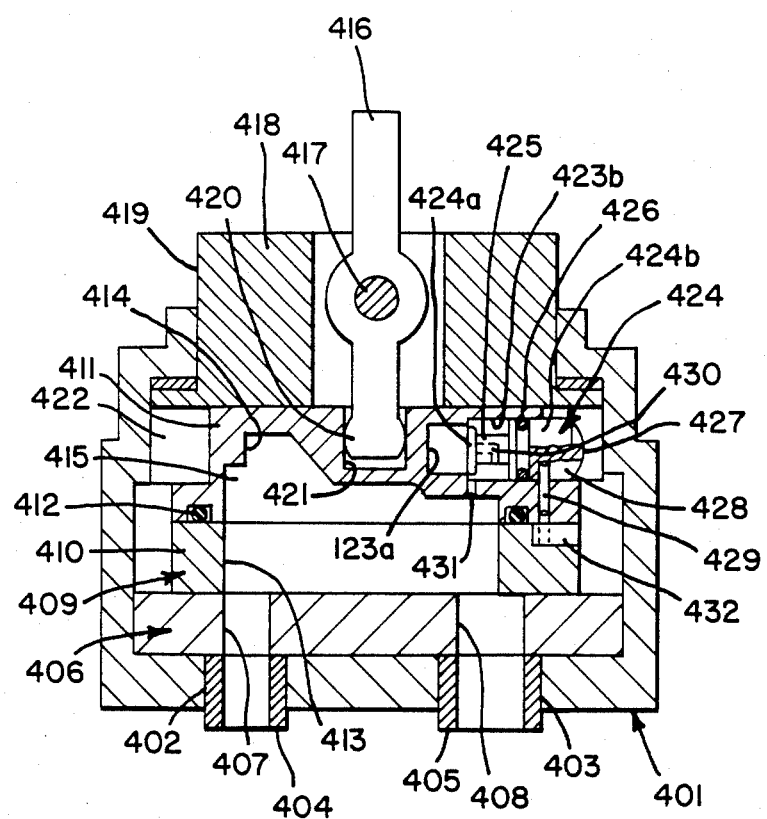
FIG. 5 is a fifth embodiment of the invention which is similar to FIG. 1 but contains an angled bore as the displacement path.

A still further embodiment of the invention is illustrated in FIG. 5. It resembles the embodiment of FIG. 1 and similar elements are designated by the same numerals with 400 added. Whereas in the embodiment of FIG. 1 the displacement path which connects the inner section 23a of the cylinder bore 23 to the outer section 23b takes the form of a groove 30 the displacement path in the embodiment of FIG. 5 is comprised of an angled bore 430 of small diameter which extends through the inner piston 424a and the piston rod 425. This difference, however, leaves the action of the movement brake unchanged.

I claim:

1. Control disc valve, in particular for sanitary use, with a first control disc which contains at least one water inlet, with a second control disc which is supported on the first control disc and comprises a recess through which water flows, in which case a movement of the second control disc brings about an alteration in the quantity of water flowing through the control discs, with a movement brake, which comprises a damping piston able to move in a cylinder bore and provides a braking force in opposition to the movement of the second control disc at least in the section of movement immediately before the completely closed position, characterised in that the cylinder bore (23) is located in the second control disc (9) and is connected by way of a bore (31) to the recess (15) in the second control disc (9), that the damping piston (24) cooperates by one end constructed as a plunger (27) with a part (1) of the valve, with respect to which the plunger (27) carries out a relative movement at the time of the movement of the second control disc (9).

2. Control disc valve according to claim 1, characterised in that the axis of the cylinder bore (23) extends parallel to the plane of contact of the two control discs (6, 9) and the part (1) with which the plunger (27) cooperates, is a side wall of the valve.

3. Control disc valve according to claim 2 with a cartridge housing, in which the two control discs are located, characterised in that the side wall is the side wall of the cartridge housing (1).

4. Control disc valve according to claim 1, characterised in that the axis of the cylinder bore extends at right angles to the plane of contact of the two control discs and the plunger cooperates with an inclined ramp on the stationary part of the valve located there above.

5. Control disc valve according to claim 4, in which the movement of the second control disc is brought about by an adjusting shaft, which is mounted to tilt in a bearing part and engages by an entrainment head in an entrainment opening in the second control disc, characterised in that the inclined ramp is formed on the bearing part.

6. Control disc valve according to claim 1, in which the movement of the second control disc is brought about by an adjusting shaft, which is mounted to tilt in a bearing part and engages by an entrainment head in an entrainment opening in the second control disc, characterised in that the plunger passes through the bearing part and at its end cooperates with a hammer-like projection on the adjusting shaft.

7. Control disc valve according to claim 1, in which the second control disc is composed of a flat ceramic disc and a plastic part, characterised in that the cylinder bore (23) is located in the plastic part (11).

8. Control disc valve according to claim 1, characterised in that
 (a) the damping piston (24) comprises an inner piston (24a) and at an axial distance therefrom an outer piston (24b);
 (b) the cylinder bore (23) has an inner section (23a) and an outer section (23b), in which case the inner piston (24a) cooperates with the inner section (23a) of the cylinder bore (23) and the outer piston (24b) cooperates with the outer section (23b) of the cylinder bore (23);
 (c) a displacement path (30) connects the inner section (23a) to the outer section (23b) of the cylinder bore (23);
 (d) the bore (31), which connects the recess (15) in the second control disc (9) to the cylinder bore (23), opens into the outer section (23b) of the cylinder bore (23).

9. Control disc valve according to claim 8, characterised in that the displacement path is an axial groove (30) in the wall of the inner section (23a) of the cylinder bore (23).

10. Control disc valve according to claim 9, characterised in that the cross section of the groove (30) varies over its longitudinal extent.

11. Control disc valve according to claim 8, characterised in that the displacement path is guided through the inner piston.

12. Control disc valve according to claim 8, characterised in that the inner piston (23b) is constructed as a lip-type packing.

13. Control disc valve according to claim 8, characterised in that a stop (29) limits the outwardly directed movement of the damping piston (24).

* * * * *